W. A. DEUTSCHER.
HARROW FOR ATTACHMENT TO SEED DRILLS.
APPLICATION FILED MAR. 18, 1915.

1,157,155. Patented Oct. 19, 1915.

Inventor:
Walter A. Deutscher
By Emil Bouvelche
Attorney.

UNITED STATES PATENT OFFICE.

WALTER ARNOLD DEUTSCHER, OF MURTOA, VICTORIA, AUSTRALIA.

HARROW FOR ATTACHMENT TO SEED-DRILLS.

1,157,155.   Specification of Letters Patent.   Patented Oct. 19, 1915.

Application filed March 18, 1915. Serial No. 15,158.

*To all whom it may concern:*

Be it known that I, WALTER ARNOLD DEUTSCHER, a subject of the King of Great Britain and Ireland, and a resident of the post-town of Murtoa, in the county of Borung, State of Victoria, Commonwealth of Australia, whose post-office address is Marma street, in the said post-town of Murtoa, have invented certain new and useful Improvements in and Connected with Harrows for Attachment to Seed-Drills, of which the following is a specification.

This invention relates to the harrowing of a field after the sowing of seed. Usually a drill having a series of hoes is employed for sowing and is provided with a lateral footboard. The drill, generally is subsequently followed by a separate harrow. This involves extra horses and additional labor. The driver, when a separate harrow is employed, must also walk behind the same. The advantages, however, of immediately harrowing a sown field are well recognized, the seed then being protected from birds and mice. Trailing chains or the attachment of an ordinary harrow behind the drill and such like propositions are, however, usually either inefficient or materially increase the draft.

The object of this invention is to provide a harrow which may be attached to and drawn by the drill without alteration thereto and without materially increasing the draft thereof. The invention is cheap, simple, light and easily and quickly attached or removed. In addition it may be folded into a minimum of space for transport and the like. Further, it is disposed in a protected position, does not interfere with free access to the drill when charging the seed box thereof, moves with the hoes when they are moved from the soil and always moves with facility over rough and uneven ground without leaving portions thereof unharrowed.

Figure 1:
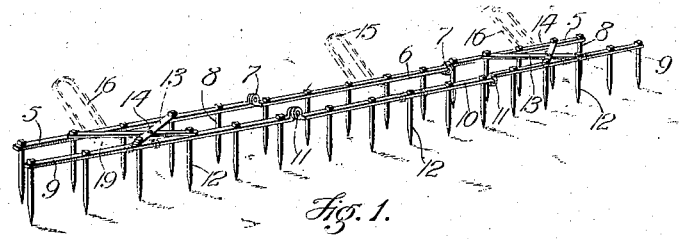
Figure 2:
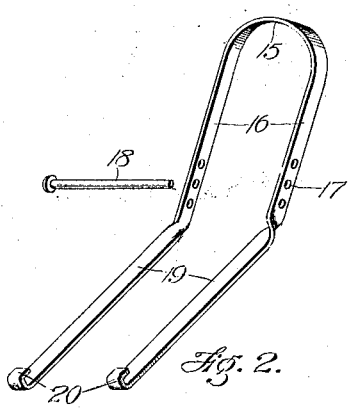
Figure 3:
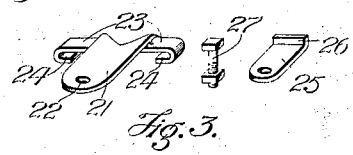
Figure 4:
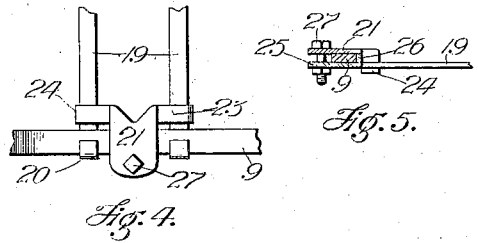
Figure 5:
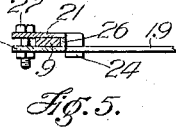
Figure 6:
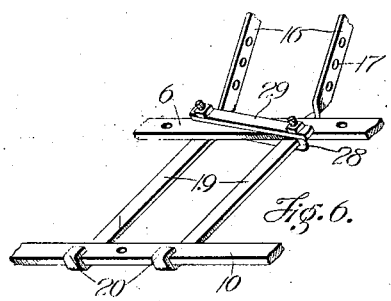
Figure 7:
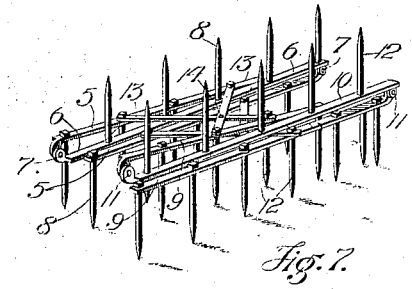
Figure 8:
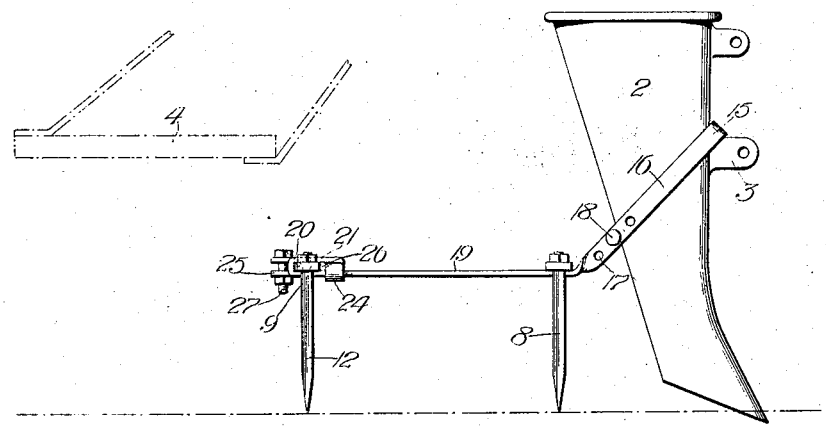

Referring to the drawings which form a part of this specification:—Figure 1 is a perspective view of a harrow according to this invention draw straps being shown in broken lines. Fig. 2 is a perspective view of a draw strap a cross pin being removed from position for convenience of illustration. Fig. 3 is a perspective view of a clamp used with a draw strap the parts being separated for convenience of illustration. Fig. 4 is a detail plan showing portion of a draw strap engaging a back tine support of the harrow and secured by a clamp. Fig. 5 is a sectional view of Fig. 4. Fig. 6 is a perspective detail view showing a modified clamp. Fig. 7 is a perspective view showing the harrow folded for transport or storage. Fig. 8 is an end elevation showing a hoe of a seed drill with the invention applied thereto. The foot board of the drill is also seen.

The invention is attached to a seed drill having a series of hoes 2 projecting from each of which is usually an arm 3 connected with controlling links and levers not concerned with the present invention. Behind the hoes is a footboard 4 extending from one side of the machine to the other. Disposed below the footboard is a harrow consisting of a sectional front tine support or bar. This is preferably divided into three (more or less) sections thereby forming two end bars 5 and an intermediate bar 6. The inner ends of the two bars 5 are pivoted by pivot pins 7 to the ends of the intermediate bar 6. Depending from each bar or section is a series of front tines 8.

Behind the front tine support or bar is a sectional back tine support or bar also consisting of three (more or less) sections and thereby forming two end bars 9 and an intermediate bar 10. The inner ends of the two ends bars 9 are pivoted by pivot pins 11 to the ends of the intermediate bar 10. Depending from each of the bars or sections is a series of back tines 12. The front and back tines are not in line, the back tines being centrally disposed in relation to the spaces between the front tines. In plan the tines are therefore zig-zagged.

Extending between and secured to each front end support or bar 5 and each back end support or bar 9 are two (more or less) diagonal cross stays 13 secured to each other at their points of intersection by pins 14 or the like. The front and back tine supports are thereby united. It is not considered necessary to provide stays between the intermediate front and back tine supports or bars. If desired the diagonal cross stays may be adjustably secured to the tine supports so that the distance between the front and back tine supports may be adjusted, if desired, by variation of the position of the stays with regard to the supports. It is obvious that the harrow may be readily folded as seen in Fig. 7.

With the foregoing and uniting the harrow to the hoes of the seed drill are three (more or less) draw straps. Each strap consists of a bow 15 having two inclined legs 16 formed in each of which is a series of adjusting holes 17 to accommodate a cross pin 18. Each bow passes around the front of a hoe 2 above the arm 3 thereof, the cross pin 18 being disposed at the back of the said hoe 2. The bows may be disposed at each side of the drill or intermediately therebetween. Integral with each inclined leg 16 of each bow 15 is a horizontal leg 19 having an up and over-turned end 20. The horizontal legs 19 may pass either over or under the sectional front tine support, the over-turned ends 20 of the said legs 19 engaging the sectional back tine support.

Retaining each of the draw straps to the harrow is a clamp. Each clamp is disposed above the ends of the horizontal legs 19 of the strap and consists of a body portion 21 resting upon the back tine support. Formed in the body portion is a bolt hole 22. Integral with the body portion 21 at each side of the same is an out-turned leg 23 having an under-turned end 24. The out-turned legs 23 are disposed above the horizontal legs 19 of the draw straps the under-turned ends 24 passing beneath the said horizontal legs 19 which are thus prevented from spreading or moving apart during operation of the harrow. Beneath each clamp and beneath the back tine support is a holding plate 25 having an up-turned front edge 26 engaging the front edge of the said back tine support. Passing through the holding plate 25 is a holding bolt 27 which also passes through the bolt hole 22 in the body portion 21 of the clamp above it.

Instead of retaining the draw straps to the harrow by the clamps described a single clamping plate could be disposed beneath the horizontal legs of each strap and be retained to the back tine support by a holding bolt or bolts thereby clamping the said legs to the said support.

In a modification the clamp described is dispensed with, a U shaped clamp 28 engaging the horizontal legs 19 of each draw strap and passing diagonally beneath the sectional back tine support or bar, as seen in Fig. 6. Above the support or bar is a diagonally disposed holding plate 29.

With this invention as the drill moves forward over the field and sows the seed the harrow is drawn immediately after the said drill. The driver stands upon the footboard 4 of the drill which being disposed above and behind the harrow protects the same and prevents the driver from stepping down thereupon inadvertently. The harrow by reason of its pivoted sections may move freely over and always engages with uneven ground. The number of sections employed may vary. The pivoted sections also provide for the harrow being folded. The bows 15 of the draw straps of the harrow loosely embrace the hose of the drill in order that the said harrow may rise vertically in relation to the hoes 2 the amount of travel being governed by the position of the adjustable cross pins 18 across the inclined legs 16 of the said bows 15. Should it be desired to remove the harrow it is only necessary to remove the holding bolts 27 from the clamps when the harrow may be immediately removed from the draw straps. Removal of the clamps 28 when employed is apparent. The draw straps may remain in position upon the hoes 2 but should it be desired to remove the said draw straps it is only necessary to withdraw the cross pins 18 thereof.

Having now described my invention, what I claim as new and desire to secure by Letters Patent is:—

1. Improvements in and connected with harrows for attachment to seed drills, consisting in the combination with a seed drill having hoes and a lateral footboard, of a folding harrow disposed behind the hoes and below the footboard.

2. Improvements in and connected with harrows for attachment to seed drills, consisting in the combination with a drill having hoes and a lateral footboard, of a harrow disposed behind the hoes and below the footboard, said harrow consisting of a series of folding pivoted sections, and means for attaching the harrow to the hoes.

3. Improvements in and connected with harrows for attachment to seed drills, consisting in the combination with a hoe drill of a harrow comprising a series of folding pivoted sections, each section having a series of tines, means secured to the harrow for attaching the same to the hoes and permitting vertical movement of the harrow in relation to the said hoes.

4. Improvements in and connected with harrows for attachment to seed drills, consisting in the combination with a hoe drill of a harrow comprising a series of folding pivoted sections, each section having a series of tines, a plurality of vertically movable draw straps secured to the harrow and passing around the hoes of the drill, and means for adjusting the vertical movement of the draw straps in relation to the hoes.

5. Improvements in and connected with harrows for attachment to seed drills, consisting in the combination with a hoe drill of a harrow having a front tine support and a back tine support each consisting of a plurality of folding pivoted sections, a series of tines carried by each support, said tines being zig-zagged in relation to each other, means for uniting the front and back tine supports, and means for attaching the harrow to the drill hoes.

6. Improvements in and connected with harrows for attachment to seed drills, consisting in the combination with a hoe drill of a harrow having a front and a back sectional tine support, a plurality of tines carried by each support, cross stays extending between the supports, and draw straps engaging the rear support and loosely passing around hoes of the drill.

7. Improvements in and connected with harrows for attachment to seed drills, consisting in the combination with a hoe drill of a harrow comprising a series of folding pivoted sections, each section having a series of tines, a plurality of vertically movable draw straps secured to the harrow and passing around the hoes of the drill, means for adjusting the vertical movement of the draw straps in relation to the hoes, each draw strap having backwardly projecting legs engaging the harrow, and means for securing the said legs to the harrow and preventing said legs moving apart.

8. Improvements in and connected with harrows for attachment to seed drills, consisting in the combination with a hoe drill of a harrow comprising a series of folding pivoted sections, each section having a series of tines, a plurality of draw straps passing around the hoes of the drill, each strap having inclined legs, each leg having therein a series of adjusting holes, a cross pin passing through the holes and extending between the legs of each strap, horizontal legs projecting from the inclined legs of each strap, and an up and overturned end to each horizontal leg engaging the back support.

9. Improvements in and connected with harrows for attachment to seed drills, consisting in the combination with a hoe drill of a harrow having a front tine support and a back tine support, each support consisting of a plurality of pivoted sections, a series of tines carried by each section, cross stays extending between the supports, draw straps passing around the hoes and engaging the back support, each draw strap being provided with inclined legs, each leg having a series of adjusting holes therein, a cross pin passing through the holes and extending between the legs of each strap, horizontal legs projecting from the inclined legs of each strap, an up and overturned end to each horizontal leg, the overturned ends engaging the back support, a U shaped clamp engaging the horizontal legs of each draw strap and diagonally disposed across the front tine support, and a holding plate secured to the clamp and diagonally disposed across the front tine support.

In testimony whereof I have hereunto affixed my signature in the presence of two subscribing witnesses.

WALTER ARNOLD DEUTSCHER.

Witnesses:
 CECIL W. PLESTEIN,
 GEORGE A. W. REN.

Copies of this patent may be obtained for five cents each, by addressing the "Commissioner of Patents, Washington, D. C."